US010872058B2

(12) United States Patent
Falk et al.

(10) Patent No.: US 10,872,058 B2
(45) Date of Patent: Dec. 22, 2020

(54) APPARATUS AND METHOD FOR PROCESSING DATA BY A RECONFIGURABLE PART OF A DIGITAL CHIP

(71) Applicant: Siemens Aktiengesellschaft, Munich (DE)

(72) Inventors: Rainer Falk, Poing (DE); Christian Peter Feist, Munich (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 16/740,562

(22) Filed: Jan. 13, 2020

(65) Prior Publication Data
US 2020/0233834 A1    Jul. 23, 2020

(30) Foreign Application Priority Data

Jan. 22, 2019   (EP) ..................................... 19152948

(51) Int. Cl.
*G06F 15/78*   (2006.01)
(52) U.S. Cl.
CPC ................ *G06F 15/7867* (2013.01)
(58) Field of Classification Search
CPC .......................... G06F 15/7867; H04L 9/3242
See application file for complete search history.

(56) References Cited

U.S. PATENT DOCUMENTS 10,401,842 B2    9/2019  Spring et al.
2009/0262926 A1  10/2009  Kabra et al.
(Continued)

FOREIGN PATENT DOCUMENTS

DE    102009013332 A1    10/2009
DE    102012215011 A1    2/2014
(Continued)

OTHER PUBLICATIONS

Vipin et al, FPGA Dynamic and Partial Reconfiguration, a Survey of Architectures, Methods and Applications, Jul. 2018, ACM Computing Surveys, vol. 51, Article 72, 39 pages (Year: 2018).*
(Continued)

*Primary Examiner* — Jyoti Mehta
(74) *Attorney, Agent, or Firm* — Schmeiser, Olsen & Watts LLP

(57) ABSTRACT

Provided is a computer-implemented apparatus for processing data, having a digital chip having at least one part that is reconfigurable by a number N of configuration descriptions, with N≥1, a determined configuration description from the number N for reconfiguring the reconfigurable part, and a providing unit for providing an identifier specific to the determined configuration description by using a number A of derivation parameters comprising the determined configuration description, with A≥1, is proposed, wherein the part reconfigured with the determined configuration description) is set up to perform a cryptographic function on determined data by using the provided specific identifier to generate cryptographically processed data. This allows security-relevant functions to be implemented as configuration descriptions. This has the advantage that the security when processing data in digital chips is increased.

11 Claims, 2 Drawing Sheets

(56) References Cited

U.S. PATENT DOCUMENTS

2017/0075344 A1  3/2017  Spring et al.
2018/0123789 A1* 5/2018  Merli .................. G09C 1/00

FOREIGN PATENT DOCUMENTS

DE    102015206643 A1   10/2016
EP         3254403 A1   12/2017
RU         2671660 C2   11/2018

OTHER PUBLICATIONS

Torres, Hashing Strings with Python, Aug. 14, 2013, 8 pages, [retrieved from the internet on Jun. 5, 2020], retrieved from URL <www.pythoncentral.io/hashing-strings-with-python/> (Year: 2013).*
Fisher, How to hash multiple values, Jan. 2018, 7 pages, [retrieved from the internet on May 4, 2020], retrieved from URL <jameshfisher.com/2018/01/09/how-to-hash-multiple-values/> (Year: 2018).*
Merli, DE-102015206643-A1, Oct. 2016, 1 page.*
Extended European Search Report dated Jul. 19, 2019 for Application No. 19152948.6, 9 pages.
Russian Office Action dated Jul. 29, 2020 for Application No. 2020102238.

* cited by examiner

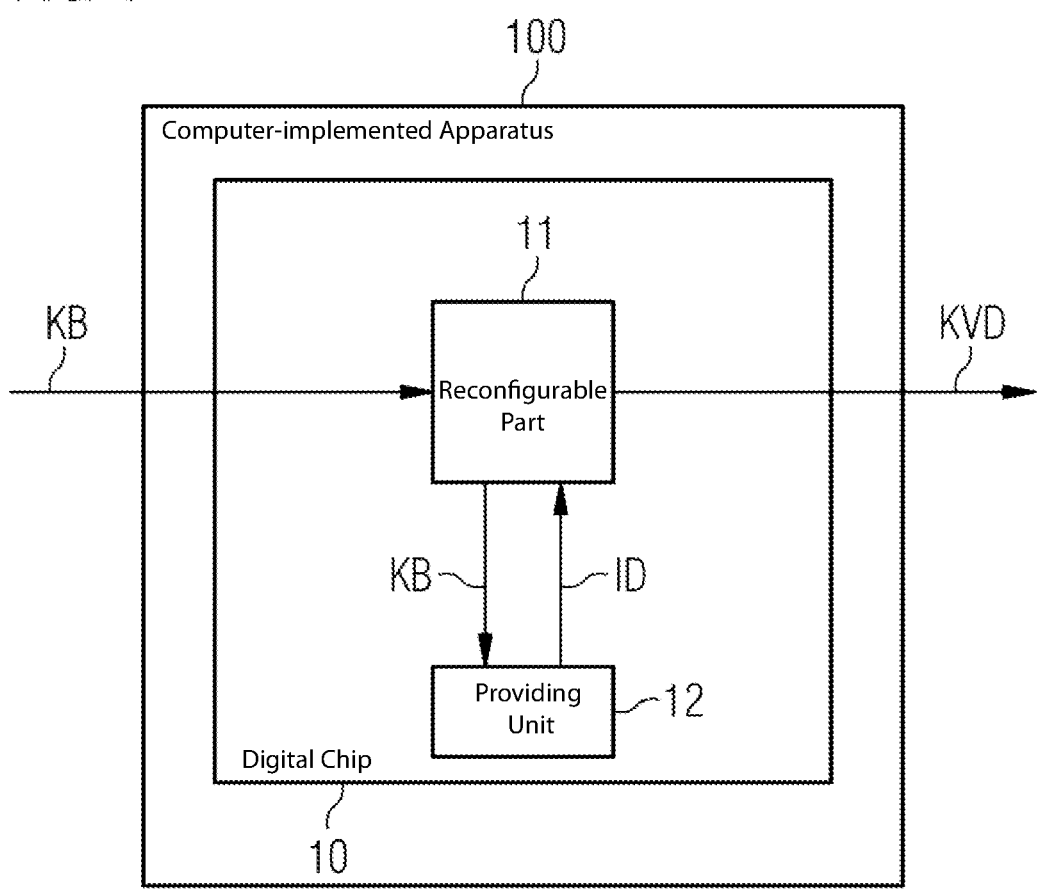

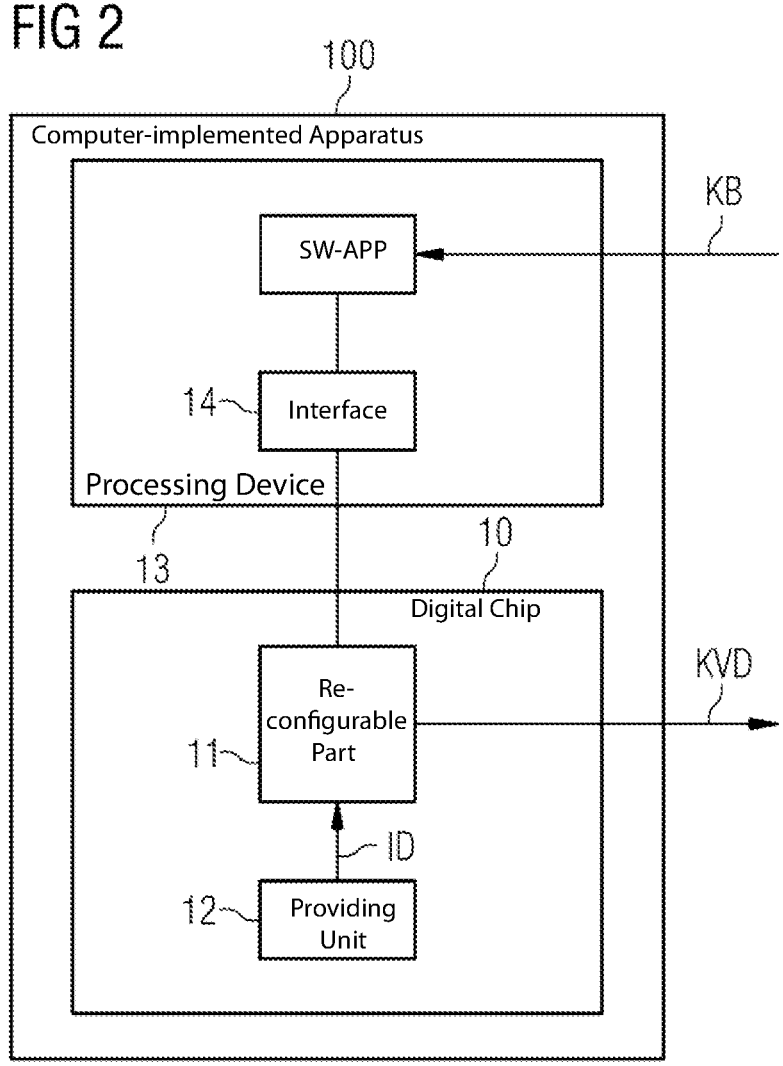
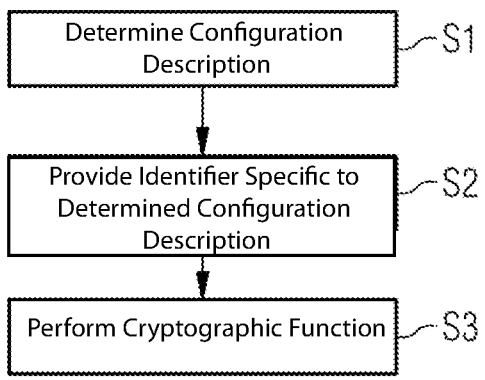

APPARATUS AND METHOD FOR PROCESSING DATA BY A RECONFIGURABLE PART OF A DIGITAL CHIP

CROSS-REFERENCE TO RELATED APPLICATIONS

This application claims priority to European Application No. 19152948.6, having a filing date of Jan. 22, 2019, the entire contents of which are hereby incorporated by reference.

FIELD OF TECHNOLOGY

The following relates to a computer-implemented apparatus, a method and a computer program product for processing data.

BACKGROUND

The technical field of embodiments of the present invention relates to the processing of data, in particular the processing of data by a reconfigurable part of a digital chip.

Applications ("apps") installable and updatable independently of a basic software system, such as an operating system, as are known from cellphones, will in future also be supported by industrial devices, such as for example an IoT (Internet of Things) device, a programmable logic controller (PLC) or a server. In this case, realtime-critical and particularly security-relevant functions, such as in particular cloud robotics, drive controllers, energy grid monitors, can be implemented as an application.

In order to implement realtime-critical and security-relevant functions, the conventional art involves the use of in particular what are known as hardware applications. A hardware application is loaded in this case into a reconfigurable part of a digital chip, such as for example an FPGA ("Field Programmable Gate Array") or a CPLD ("Complex Programmable Logic Device").

Furthermore, the conventional art reveals that a unique serial number of the FPGA is provided as a hardware identifier to a digital circuit loaded into the FPGA. Further, it is known practice to reconfigure at least part of the FPGA, what is known as the reconfigurable part (partial reconfiguration). This involves the reconfigurable part being updated by loading a partial bit stream, such as for example the hardware application, while the remainder of the digital circuit of the FPGA remains operative, that is to say continues to operate in regular fashion.

It is known that software applications on cellphones are provided with various identifiers that are usable for tracking users, for example. Furthermore, persistent device identifiers, such as the MAC address (Media Access Control Address) of a network adapter or the IMEI (International Mobile Station Equipment Identity) of a mobile radio modem, are known. There are likewise different identifiers that are unique for a software application, for example, which are able to be associated with a user of a device and which are provided by means of a container that comprises cryptographic keys and digital signatures.

SUMMARY

An aspect relates to the security of the processing of data by using a digital chip.

In accordance with a first aspect, a computer-implemented apparatus for processing data, having a digital chip having at least one part that is reconfigurable by a number N of configuration descriptions, with N≥1, a determined configuration description from the number N for reconfiguring the reconfigurable part, and a providing unit for providing an identifier specific to the determined configuration description by using a number A of derivation parameters comprising the determined configuration description, with A≥1, is provided, wherein the part reconfigured with the determined configuration description is set up to perform a cryptographic function on determined data by using the provided specific identifier to generate cryptographically processed data.

The present apparatus permits a configuration description or a group of determined configuration descriptions to be provided with an identifier specific to the determined configuration description or group of determined configuration descriptions in a simple manner. By means of the reconfigurable part of the digital chip, it is subsequently possible to perform a cryptographic function on determined data by using the provided specific identifier to generate cryptographically processed data.

This allows security-relevant functions, such as for example a key memory (trust anchor) to be implemented as a hardware application (configuration description). The identifier specific to the determined configuration description is available here only to this determined configuration description on a digital chip. This has the advantage that the security is increased for the processing of data in digital chips, since security-relevant hardware applications can be implemented in which manipulation of the parameters of the hardware applications by the executed software, such as for example a software application, a runtime environment, or an operating system, is prevented.

The digital chip is in particular in the form of an FPGA (Field Programmable Gate Array), in the form of a CPLD (Complex Programmable Logic Device) or in the form of a virtual FPGA. The virtual FPGA may be in the form of an ASIC/SoC (Application-specific Integrated Circuit, System-on-a-chip), in the case of which one or more reconfigurable parts are already provided, for example by the manufacturer, within the digital chip and are configurable at a later time. The digital chip comprises at least one reconfigurable part, in particular.

The configuration description is in particular a bit stream. The bit stream is may be a sequence of bits of determined length. The bit stream comprises for example a basic bit stream and a partial bit stream. The basic bit stream is used in particular to initially configure all parts comprising the digital chip, that is to say including the at least one reconfigurable part, once. The partial bit stream has in particular information pertaining to the configuration of a reconfigurable part of the digital chip and is used in particular to reconfigure the reconfigurable part of the digital chip as often as desired. The configuration description can also be referred to as a hardware application, since it is used within the digital chip, such as the FPGA (hardware). The configuration description defines in particular the configuration of the digital chip in full (basic bit stream) or in part (partial bit stream).

The reconfiguring of the digital chip is understood to mean in particular a reconfiguring of the reconfigurable part of the FPGA (digital chip). The reconfiguring and the configuring comprise loading a digital circuit into the digital chip, the digital circuit being arranged within the configuration description and therefore being part of the bit stream.

The providing, which is performed by the providing unit, comprises in particular generating or producing and subsequently providing the identifier or identifiers specific to the determined configuration description. By way of example, a determined configuration description is provided with multiple specific identifiers. In particular, the identifier specific to the determined configuration description is formed by using a hardware identifier of the digital chip and the determined configuration description. As a result, in particular an identifier that is specific to a determined copy of the digital chip and the determined configuration description is provided. However, it is possible to additionally or alternatively provide a specific identifier that is only specific to the determined configuration description, but nonspecific to the determined copy of the digital chip. The identifier can be in particular specific to the loaded basic bit stream.

The respective unit, for example the providing unit, may be implemented in hardware and/or also in software. In the case of a hardware implementation, the respective unit may be in the form of an apparatus or in the form of part of an apparatus, for example in the form of a computer or in the form of a microprocessor or in the form of a control computer of a vehicle. In the case of a software implementation, the respective unit may be in the form of a computer program product (non-transitory computer readable storage medium having instructions, which when executed by a processor, perform actions), in the form of a function, in the form of a routine, in the form of part of a program code or in the form of an executable object.

The cryptographic function comprises for example cryptographic encrypting, cryptographic decrypting and/or digital signing for processing and/or generating cryptographically processed data. The cryptographic functions listed above are implemented by using cryptographic keys.

A cryptographic key may be in the form of a symmetric key, in the form of a public key and/or in the form of a private key.

The computer-implemented apparatus may comprise a software runtime environment configured to provide an environment for executing software. The software is for example an operating system executed within the software runtime environment in order to operate the computer-implemented apparatus. The software runtime environment comprises in particular a software application and provides an environment in which at least one digital chip having a configuration description can be operated. A software application is in particular a program that is independent of the operating system and that can be used to implement different applications and functions. A specific identifier provided by means of the providing unit is in particular specific to a software application.

In accordance with one embodiment, the providing unit is set up to form the specific identifier provided for the determined configuration description within the digital chip.

As a result of the specific identifier provided for the determined configuration description being formed within the digital chip, the specific identifier is formed exclusively within the digital chip and outside the software and the software application.

This has the advantage that manipulations of the identifier or identifiers specific to the determined configuration description by software or software applications can be prevented and it is further possible to prevent the parameters of the specific identifier or of the specific identifiers from being accessible via unauthorized software applications. This allows security-relevant determined configuration descriptions to be implemented in which manipulation of the security-relevant derivation parameters by the executed software or software application is prevented. The security for forming the specific identifier provided for the determined configuration description and for processing data by means of the digital chip by using the identifier is therefore increased.

In accordance with a further embodiment, the apparatus comprises, in addition to the digital chip, a processing device that is set up to reconfigure the reconfigurable part by using the determined configuration description at runtime.

In particular, the development of a digital chip, such as for example an FPGA, a system on a chip with programmable logic and software CPUs or an ASIC with an embedded FPGA, involves special alterable regions being stipulated, what are known as the reconfigurable parts within the digital chip.

The digital circuits implemented in these reconfigurable parts can be configured again (reconfigured) in the course of operation (at runtime) without influencing the remainder of the digital circuit of the FPGA. In particular a configuration description is therefore implemented as a partial bit stream for such a reconfigurable part and loaded and/or instantiated at runtime, without this requiring the remainder of the digital circuit of the digital chip to be stopped and/or configured again.

This embodiment has the advantage that the power draw of the digital chip can be reduced by deactivating unneeded circuit parts. Furthermore, applications that require changes to the digital circuit or the circuit logic in the course of operation can be implemented on the digital chip. This increases the flexibility, performance and the user friendliness of the apparatus.

The reconfiguration of the reconfigurable part at runtime can also be referred to as dynamic reconfiguring.

In accordance with a further embodiment, the providing unit is set up to form a hash value as the specific identifier by applying a determined hash function to the determined configuration description.

The hash value is in particular a bit sequence having a specific length, for example 128 bits, 160 bits, 256 bits, 384 bits or else 512 bits. The hash value can be generated or calculated from a specific configuration description by means of a hash function, for example. The hash function here maps the configuration description onto the hash value with a fixed length. This mapping is unique. Such a hash function is referred to as collision-resistant, for example. This is understood to mean in particular that there are no two differing bit streams that produce the same hash value. The hash value of a specific bit stream can therefore also be referred to as a "fingerprint". Examples of hash functions, also referred to as hash algorithms, are MD5, SHA-1, SHA-2 or SHA-3. By way of example, SHA-256 denotes the SHA-2 hash algorithm, wherein a respective hash value has a length of 256 bits. A hash value can also be used as a key. This involves in particular the key used as a hash value being used to form a key derivation function, such as HMAC-SHA256.

In accordance with a further embodiment, the providing unit is set up to provide an identifier specific to a group of determined configuration descriptions.

A group of determined configuration descriptions comprises in particular at least two determined configuration descriptions. The determined configuration descriptions of the group are in different forms, for example. In particular, at least two different determined configuration descriptions are provided with a specific identical identifier. A unique specific identifier is referred to in this case. It is also possible for biunique mapping between the configuration descriptions and the specific identifiers to be used. A group of determined configuration descriptions is provided with an identifier specific to the group of determined configuration descriptions.

In particular, the group comprises at least one determined configuration description and at least one software application associated with the determined configuration description.

In accordance with a further embodiment, the providing unit is set up to form a hash value as the identifier specific to the group of determined configuration descriptions by applying a determined hash function to the group of determined configuration descriptions.

In particular, the determined configuration descriptions are concatenated and then the determined hash function is applied to the concatenated determined configuration descriptions to form the identifier specific to the group.

In particular, the hash value for the group of determined configuration descriptions is formed by using a "reconfiguration and update manager" (RUM).

In accordance with a further embodiment, the providing unit is further set up to form a respective unique hash value for a respective data packet comprising the group of determined configuration descriptions.

The data packet comprises in particular multiple determined configuration descriptions. Furthermore, the data packet can also contain one or more software applications and/or meta data associated with the determined configuration descriptions. The multiple determined configuration descriptions may be combined into a group. The determined configuration descriptions of the group, that is to say of the data packet, are used in particular to form a hash value that is unique to the data packet. Within the group, each determined configuration description is provided with the same hash value, that is to say the same specific identifier, for example. In particular, the individual determined configuration descriptions of the data packet are concatenated. The concatenated determined configuration descriptions, that is to say of the assembled bit stream comprising the concatenated bit stream formed, is used to form a hash value.

Furthermore, it is possible for a hash value for each determined configuration description to be formed, for example, by applying a hash function to the respective determined configuration description. Subsequently, the hash values of the determined configuration descriptions are concatenated, and a common hash value is formed by applying the hash function to the concatenated hash values.

In accordance with a further embodiment, the number A of derivation parameters further comprises one or more values from a secure element, a secret device parameter, a physical device property, for example ascertainable by means of an analog-to-digital converter or by means of a physical unclonable function (PUF), a cryptographic key, a cryptographic starting value and/or a key generation parameter.

The secure element is in particular a hardware platform by means of which security-relevant and cryptographic data are stored and applications can be securely executed. The use of the secure element may influence the formation of a derivation parameter.

In accordance with a further embodiment, the providing unit is set up to form a hash value as the specific identifier by applying a determined hash function to the determined configuration description and at least one further instance from the number A of derivation parameters.

In accordance with a further embodiment, the providing unit is set up to form a hash value as the identifier specific to the group of determined configuration descriptions by applying a determined hash function to the group of determined configuration descriptions and at least one further instance from the number A of derivation parameters.

In particular, it is possible to provide an encryption and decryption system on the basis of at least two of the determined configuration descriptions and at least one software application. This involves for example both a first determined configuration description and a second determined configuration description being provided with an identifier specific to the two configuration descriptions, which identifier can be used to derive a common cryptographic key. The first determined configuration description is used in particular for encryption, while the second determined configuration description may be used for decryption, the encryption and decryption taking place in particular using the common cryptographic key. In particular, the software application is set up to have the encryption and decryption of the determined data performed using the digital chip.

The provision of a first identifier specific to a first determined configuration description by means of a derivation parameter involves a cryptographic key for encrypting, such as for example a public key for a public key crypto method, determined data being incorporated into the first identifier as well, whereas the provision of a second identifier specific to a second determined configuration description by means of a derivation parameter involves a cryptographic key, in particular a private key from a public key crypto method, for decrypting the cryptographically processed data being incorporated into the second identifier as well.

Furthermore, the keys from the public key crypto method can also be used, instead of for encryption, for generating a digital signature by means of a first determined configuration description and for checking a digital signature by means of a second determined configuration description.

In particular, the number A of derivation parameters furthermore comprises meta data, such as a manifest, which is arranged inside at least one determined configuration description from a group of determined configuration descriptions or a data packet, and a derivation parameter, which is associated with the software application associated with the determined configuration description. Additionally, the number A of derivation parameters may comprise a public key or a digital certificate that is used to sign the data packet, or for example a user identifier, a group identifier or a prescribed security label, under which the software application is executed within the software runtime environment.

In accordance with a further embodiment, the processing device comprises a software application and an interface for connecting the software application and the reconfigurable part, wherein the software application is set up to perform at least one operation by using the interface on the reconfigurable part.

This has the technical effect, for example, that the software application can carry out operations on the reconfigurable part of the digital chip. The flexibility of the use of the computer-implemented apparatus is thus increased.

Furthermore, the software application is set up in particular to reconfigure its associated reconfigurable parts again and to use them for specific purposes, such as for example the relocation of specific calculations in hardware to relieve the load on the CPU and/or the splitting of complex hardware into multiple reconfigurable parts in order to be able to save resources of the digital chip.

The computer-implemented apparatus has a persistent memory device, which is connected to the processing device, and at least the one digital chip.

The processing device comprises in particular the reconfiguration and update manager (RUM), which is set up for example to perform starting of the software application, formation of an identifier specific to the determined configuration description and/or association of one or more reconfigurable parts with a software application. The RUM may be arranged outside the software application and the digital chip.

By way of example, the digital chip further has a logic chip connected to the RUM via a driver chip within the processing device. In particular, the logic chip is set up to take the determined configuration description and a hardware identifier of the digital chip as a basis for using a hash function, such as the SHA256, to form an identifier specific to the determined configuration description. The formation of the specific identifier is performed by the logic chip, in particular, in this case.

Additionally and/or alternatively, the logic chip is set up to use a device key of the digital chip, in particular, to form an identifier specific to the determined configuration description.

The identifier specific to the determined configuration description is provided to the reconfigurable part via an app register. The app register is in particular part of the digital chip.

By way of example, the software application is set up to manage multiple determined configuration descriptions in multiple reconfigurable parts of a digital chip. Alternatively, multiple software applications can share multiple determined configuration descriptions in a digital chip.

In particular, an identifier specific to the determined configuration description is formed by using the driver chip and is provided to the logic chip within the digital chip. The logic chip in turn uses the app register to provide one or more reconfigurable parts with the identifier specific to the determined configuration description.

By way of example, multistage formation of an identifier specific to the determined configuration description is possible in which substeps by the RUM, by the driver chip and/or by the logic chip take place.

In accordance with a further embodiment, the digital chip contains a configurable part that comprises the at least one reconfigurable part, wherein the processing device is set up to initially configure the configurable part at a determined time by using one of the number N of configuration descriptions.

In particular, the configuring comprises an initial configuring and a reconfiguring. In particular, the initial configuring is performed once during production or whenever the device starts. The configurable part develops the digital chip. The configurable part of the digital chip has multiple reconfigurable parts, for example.

The determined time comprises in particular a time after the production of the digital chip, before the use of the digital chip, when the digital chip is started up for the first time and/or whenever the apparatus restarts. The latter case is used in particular for FPGAs using volatile memory technology, such as for example SRAM (Static Random-Access Memory).

In accordance with a further embodiment, the computer-implemented apparatus is in the form of a field device, in the form of a controller, in the form of a monitoring device, in the form of an IoT device, in the form of an edge cloud device, in the form of a cloud server or in the form of an App-enabled time server.

In accordance with a second aspect, a method for operating a computer-implemented apparatus that comprises a digital chip having at least one part that is reconfigurable by a number N of configuration descriptions, is provided. The method has the following steps:

a) loading a determined configuration description from the number N for reconfiguring the reconfigurable part, b) providing an identifier specific to the determined configuration description by using a number A of derivation parameters comprising the determined configuration description, with A≥1, and c) performing a cryptographic function on determined data by using the provided specific identifier by means of the part reconfigured with the determined configuration description to generate cryptographically processed data.

In accordance with a third aspect, a computer program product is proposed that prompts the performance of the method as explained above on a program-controlled device.

A computer program product, such as e.g. a computer program means, can be provided or supplied for example as a storage medium, such as e.g. a memory card, USB stick, CD-ROM, DVD, or else in the form of a downloadable file from a server in a network. This can be effected for example in a wireless communication network by transmitting an appropriate file comprising the computer program product or the computer program means.

The embodiments and features described for the proposed apparatus apply to the proposed method accordingly.

Further possible implementations of embodiments of the invention also comprise combinations, not explicitly mentioned, of features or embodiments described above or below for the exemplary embodiments. A person skilled in the art will also add individual aspects here as improvements or additions to the respective basic form of embodiments of the invention.

BRIEF DESCRIPTION

Some of the embodiments will be described in detail, with reference to the following figures, wherein like designations denote like members, wherein:

FIG. 1 shows a schematic block diagram of a first exemplary embodiment of a computer-implemented apparatus for processing data;

FIG. 2 shows a schematic block diagram of a second exemplary embodiment of a computer-implemented apparatus for processing data with a digital chip and a processing device; and FIG. 3 shows a schematic flowchart for an exemplary embodiment of a method for operating a computer-implemented apparatus.

DETAILED DESCRIPTION

FIG. 1 shows a schematic block diagram of a first exemplary embodiment of a computer-implemented apparatus 100 for processing data. The computer-implemented apparatus 100 comprises a digital chip 10 having at least one part 11 reconfigurable by a number N of configuration descriptions KB, with N≥1, and a determined configuration description KB from the number N for reconfiguring the reconfigurable part 11. Furthermore, the computer-implemented apparatus 100 comprises a providing unit 12.

The providing unit 12 is set up to provide an identifier ID specific to the determined configuration description KB by using a number A of derivation parameters that comprise the determined configuration description KB, with A≥1. Further, the part 11 reconfigured with the determined configuration description KB is set up to perform a cryptographic function on determined data by using the provided specific identifier ID to generate cryptographically processed data KVD. As depicted in FIG. 1, the providing unit 12 is set up in particular to form the specific identifier ID provided for the determined configuration description KB within the digital chip 10. Further, the providing unit 12 is set up for example to form the specific identifier ID provided for the determined configuration description KB outside (not depicted) the digital chip 10.

The providing unit 12 may be set up to form a hash value as the specific identifier ID by applying a determined hash function to the determined configuration description KB.

By way of example, the providing unit 12 is set up to provide an identifier ID specific to a group of determined configuration descriptions KB.

Furthermore, the providing unit 12 is set up in particular to form a hash value as the identifier ID specific to the group of determined configuration descriptions KB by applying a determined hash function to the group of determined configuration descriptions KB.

The providing unit 12 is set up to form a respective unique hash value for a respective data packet comprising the group of determined configuration descriptions KB. The data packet can in particular also comprise in this case one or more software applications and meta data, such as for example an app manifest.

Further, the number A of derivation parameters comprises for example one or more values from a secure element, a secret device parameter, a physical device property, a cryptographic key, a cryptographic starting value and/or a key generation parameter.

In particular, the providing unit 12 is set up to form a hash value as the specific identifier ID by applying a determined hash function to the determined configuration description KB and at least one further instance from the number A of derivation parameters.

The providing unit 12 is set up to form a hash value as the identifier ID specific to the group of determined configuration descriptions KB by applying a determined hash function to the group of determined configuration descriptions KB and at least one further instance from the number A of derivation parameters.

The digital chip 10 contains for example a configurable part that comprises the at least one reconfigurable part 11. Furthermore, the processing device 13 is set up in particular to initially configure the configurable part at a determined time by using one of the number N of configuration descriptions KB.

The computer-implemented apparatus 100 may be in the form of a field device, in the form of a controller, in the form of a monitoring device, in the form of an IoT device, in the form of an edge cloud device, in the form of a cloud server or in the form of an App-enabled time server.

FIG. 2 shows a schematic block diagram of a second exemplary embodiment of a computer-implemented apparatus 100 for processing data. The second exemplary embodiment in FIG. 2 is based on the first exemplary embodiment in FIG. 1 and has all of the features of the first exemplary embodiment. Besides that, the computer-implemented apparatus 100 in FIG. 2 has a processing device 13.

The processing device 13 is set up to reconfigure the reconfigurable part 11 by using the determined configuration description KB at runtime.

The processing device 13 comprises a software application SW-APP and an interface 14 for connecting the software application SW-APP and the reconfigurable part 11. The software application SW-APP is set up for example to perform at least one operation by using the interface 14 on the reconfigurable part 11. This involves the software app SW-APP using the interface 14 to provide the reconfigurable part 11 with at least the determined configuration description KB. The providing unit 12, which is in particular in the form of a logic chip, may be set up to provide an identifier ID specific to the determined configuration description KB to the reconfigurable part 11 indirectly or directly.

FIG. 3 shows a schematic flowchart for an exemplary embodiment of a method for operating a computer-implemented apparatus 100 as shown in FIG. 1 or as shown in FIG. 2. The computer-implemented apparatus 100 comprises a digital chip 10 having at least one part 11 reconfigurable by a number N of configuration descriptions KB.

The exemplary embodiment in FIG. 3 comprises the following method steps S1 to S3:

In step S1, a determined configuration description KB from the number N for reconfiguring the reconfigurable part 11 is loaded.

In step S2, an identifier ID specific to the determined configuration description KB is provided by using a number A of derivation parameters comprising the determined configuration description KB, with A≥1.

In step S3, a cryptographic function is performed on determined data by using the provided specific identifier ID by means of the part 11 reconfigured with the determined configuration description KB to generate cryptographically processed data KVD.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented apparatus for processing data, having a digital chip having at least one reconfigurable part that is reconfigurable by a number N of configuration descriptions, with N≥2, a determined configuration description from the number N for reconfiguring the at least one reconfigurable part into a reconfigured part, and a providing unit for providing an identifier specific to the determined configuration description by using a number A of derivation parameters comprising the determined configuration description, with A≥1, wherein the reconfigured part with the determined configuration description is configured to perform a cryptographic function on determined data by using the provided identifier specific to the determined configuration description to generate cryptographically processed data, wherein the providing unit is set up to provide an identifier specific to a group of determined configuration descriptions, the group of determined configuration descriptions including at least two determined configuration descriptions of the number N of configuration descriptions,
wherein the providing unit is set up to form a hash value as the identifier specific to the group of determined configuration descriptions by applying a determined hash function to the group of determined configuration descriptions.

2. The computer-implemented apparatus as claimed in claim 1, wherein the providing unit is set up to form the provided identifier specific to the determined configuration description within the digital chip.

3. The computer-implemented apparatus as claimed in claim 2, wherein the computer-implemented apparatus comprises, in addition to the digital chip, a processing device comprising software that is set up to reconfigure the at least one reconfigurable part by using the determined configuration description at runtime.

4. The computer-implemented apparatus as claimed in claim 3,
wherein the processing device comprises an interface for connecting the software and the at least one reconfigurable part, wherein the software is configured to perform at least one operation by using the interface.

5. The computer-implemented apparatus as claimed in claim 3, wherein the digital chip contains a configurable part that comprises the at least one reconfigurable part, wherein the processing device is set up to initially configure the configurable part at a determined time by using one of the number N of configuration descriptions.

6. The computer-implemented apparatus as claimed in claim 5, wherein the providing unit is set up to form a hash value as the identifier specific to the determined configuration description by applying a determined hash function to the determined configuration description.

7. The computer-implemented apparatus as claimed in claim 1, wherein the providing unit is further set up to form a respective unique hash value for a respective data packet comprising the group of determined configuration descriptions.

8. The computer-implemented apparatus as claimed in claim 1,
wherein the number A of derivation parameters is greater than 1 and comprises one or more values from a secure element, a secret device parameter, a physical device property, a cryptographic key, a cryptographic starting value, and a key generation parameter.

9. The computer-implemented apparatus as claimed in claim 8, wherein the providing unit is set up to form a hash value as the identifier specific to the determined configuration description by applying a determined hash function to the determined configuration description and at least one further instance from the number A of derivation parameters.

10. The computer-implemented apparatus as claimed in claim 1, wherein the providing unit is set up to form a hash value as the identifier specific to the group of determined configuration descriptions by applying a determined hash function to the group of determined configuration descriptions and at least one further instance from the number A of derivation parameters.

11. The computer-implemented apparatus as claimed in claim 1,
wherein the computer-implemented apparatus is in the form of a field device, in the form of a controller, in the form of a monitoring device, in the form of an IoT device, in the form of an edge cloud device, in the form of a cloud server or in the form of an App-enabled time server.

* * * * *